United States Patent Office 3,028,784
Patented Apr. 10, 1962

3,028,784
PHOTOGRAPHIC EXPOSURE METERS
Ludwig Leitz, Heinrich Broschke, and Otto Sanger, Wetzlar (Lahn), Germany, assignors to Ernst Leitz, G.m.b.H., a corporation of Germany
Filed Feb. 19, 1958, Ser. No. 716,080
Claims priority, application Germany Feb. 23, 1957
3 Claims. (Cl. 88—23)

This invention relates to exposure meters for photographic and cinemaphotographic purposes where the light rays emanating from the several portions of the object are integrated and the mean value thereof used as a basis for measuring the exposure, for photographing the object under consideration. Such integrated measuring may lead to incorrect exposure if either the bright portions or the dark portions of the object are predominant. Since such exposure meters only show the integrated measuring values, there is no indication of the proportion of bright portions or dark portions of which the integrated measuring values are formed or composed respectively. If, therefore, for an object having predominant bright or dark portions the exposure time is based only upon the integrated measuring value, the exposure of the predominant bright or dark portion respectively will become too great or too small respectively.

Therefore, in using the value indicated by the exposure meter for the correct setting of the diaphragm and the exposure regulating means in the camera, a correction is made by adjusting the said camera means to a different value other than that which is indicated by the exposure meter in order to obtain the correct exposure of an object having predominant bright or dark portions in its range of illumination.

Such correction of the integrated measuring values always involve certain mental calculations to determine whether to correct for an increase or a decrease in the exposure value.

According to this invention such mental deliberations are eliminated or facilitated in that this invention provides an exposure meter having corrective marks as indicating symbols for either an increase or a decrease of the measuring value in considering bright portions or dark portions of the object.

These identifying marks are placed on both sides of the integration value mark or of a setting mark of the scales. The distances or the character of the correction identifying marks on both sides are so planned that they correspond to the extent of predetermined time or diaphragm intervals.

The invention may be used with optical and electrical exposure meters or with manually operated meters or such as are coupled with the diaphragm or exposure regulating means of a camera.

Applying the invention on photoelectric exposure meters there exists a further difficulty in considering such corrective values in the known non-linear characteristics of such electrical measuring instruments. With exposure meters having a pointer which moves along a scale, one may use the known leading scales as a means for equalizing the non-linear characteristic of the pointer movement and thereby also as an assisting means for reading or adjusting the correction values.

With other photoelectric exposure meters having follow-up pointers or exposure meters with setting of the regular meter pointer with relation to a fixed mark, the follow-up pointer and the setting means of the regular meter pointer respectively may be connected to reading scales or to the exposure setting means of a camera respectively, other equalizing means are necessary to make the corrective marks applicable to such exposure meters.

Therefore, further objects of the invention are combinations of the corrective marks with the equalizing means considering the non-linear characteristics of such photoelectric exposure meters.

The details of the invention are illustrated in the accompanying drawings which show the invention in connection with photoelectric exposure meters, but as the construction and operation of such instruments are known, only so much of them is illustrated as is necessary for understanding the invention.

Figure 1:
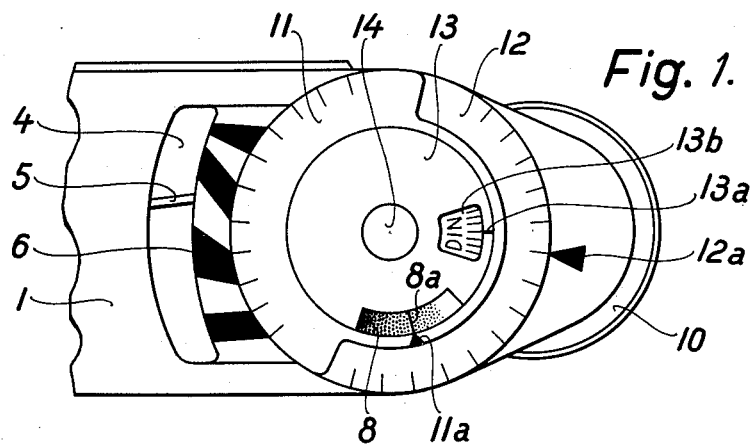
FIG. 1 illustrates a top view of the main portion of a photoelectric exposure meter which is operatively connectable with the timing knob of a photographic camera.

The purpose of FIG. 1 is to illustrate the basic principle underlying the invention. There is shown an electric exposure meter coupled or operatively connected with the timing knob of the camera. The shutter scale of the exposure meter is adjustable with relation to a follow-up pointer mark positioned in relation to a tinted corrective scale. The exposure meter 1 is in known manner provided with an operating or coupling member 10 which serves to rotate the scale disks 11, 12 and 13 for the diaphragm and time settings and also for connection with the adjusting or setting elements of a photographic or cinemaphotographic camera (time and diaphragm settings). The movement of the regular pointer 5 is seen in a window 4 in relation to a leading scale 6. The latter serves as a means for observing the pointer indicated values in scale values on the diaphragm scale 11.

The scale disks 11 and 12 are frictionally connected with the rotatable disk 13 which rotates about the pivot 14. The disks 11 and 12 are relatively adjustable and also adjustable with relation to the disk 13. The scale disk 12 for the time values is adjustable with relation to a mark 13a on the scale disk 13 which indicates the sensitivity of the film as seen in the window 13b. The scale disk 12 is thus adjustable in relation to the disk 13. The diaphragm scale ring 11 has a mark 11a by means of which the ring 11 is adjustable with relation to a corrective scale 8 on the scale disk 13. The mark 8a on the correction scale 8 shows the basic position of the scale 11 and its pointer mark 11a with relation to the corrective mark 8 by a normal division of the bright and the dark portions of the object.

In this manner the sensitivity of the film as well as the corrective values required in considering predominant bright and dark portions of the object are independently adjustable. The diaphragm scale 11 acts as a follow-up pointer. For measuring the exposure values the desired diaphragm value required for the exposure is set—by means of turning the knob 10 and by means of the leading scale 6—in relation to the particular or immediate stroke of the pointer 5. At the same time by these means the coupled exposure meter also sets the exposure time.

The numeric diaphragm value may be read by means of the pointer 5 and the leading scale 6 in relation to the diaphragm scale 11. If the numeric time value also is to be tested or the exposure meter is used as a manually operated device, then the time value may be read by means of the fixed mark 12a in relation to the time scale 12. If now dominant bright or dark portions of the object are to be considered, this may be done by setting one or two scale steps wholly or partly and more or less, in the bright or dark direction of the corrective mark 8, respectively, in relation to the index mark 12a of the scale 12. In that case the corrective mark only shows the direction for increasing or decreasing the measured main value.

Otherwise, predominant bright or dark portions of the object may be considered, before the exposure values are measured. In that case, the index mark 11a is set in relation to a bright or dark portion of the corrective mark 8, respectively, corresponding to the amount of correction. If now measuring in the usual manner, the time and diaphragm values, considering dominant bright or dark portions of the object, are directly readable by means of the index mark 12a or the pointer 5 respectively; if the exposure meter is coupled with the time setting means of the camera, the correct time is set.

Figure 2:
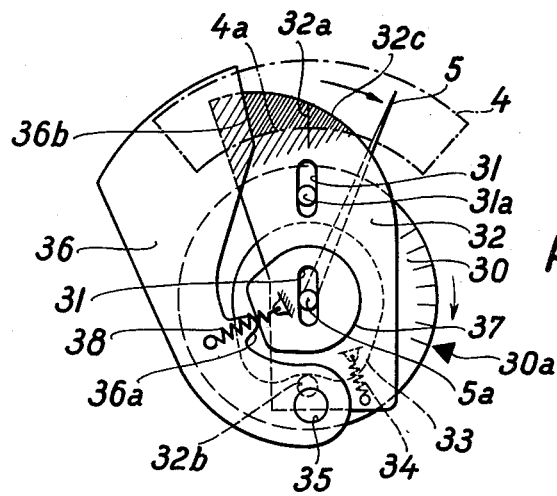
FIG. 2 illustrates schematically a top view of a portion of a photoelectric exposure meter having a follow-up pointer and an adjustable correction mark for automatic adaption of the size of such mark to the deflection characteristic of the meter.

FIG. 2 shows an arrangement whereby a corrective field is formed in the window 4 of the exposure meter. The corrective field is combined with a follow-up pointer provided with equalizing means to consider the non-linear characteristic of the strokes of the meter pointer. In this embodiment of the invention the detailed construction of the exposure meter is not shown.

The regular strokes of the meter pointer 5 are observed in the window 4. The pointer swings about its pivot 5a. Also rotatable about the pivot 5a is the scale disk 30 which may be provided with markings of time values, diaphragm values or light values, respectively. These markings are readable by a fixed mark 30a. The scale disk 30 supports a slide 32 which may be partly transparent and the movements of the slide 32 are guided by slots 31, a pin 31a and the pivot 5a as shown. The pin 31a is carried by the rotatable scale disk 30; it transfers the rotation of the scale disk 30 to the slide 32.

The slide 32 carries the follow-up pointer 32a and a knob 32b which runs on a fixed cam 33 being held thereon by a spring 34. The slide 32 has at its outer end a curved side 32c which moves within the window 4, the same as the follow-up pointer 32a. The color of the slide 32 is different from the background color of the window 4. The rotatable scale disk 30 supports a pivot 35. A segment 36 is mounted to swing on this pivot so as to cover, or uncover, a portion of the window 4 and a portion of the curve 32c which may appear within the window. The segment 36 has a nose 36a which engages a fixed cam 37 held in contact with it by a spring 38.

Depending upon the positions which the aforesaid several elements may take at the end of the follow-up movement of the follow-up pointer 32a to align it with the stroke of the meter pointer 5, there will appear a more or less wedgelike picture in the window 4 on each side of the follow-up pointer 32a, formed by that part of the colored slide 32, 32c which is visible within the window 4 and the visible background parts of the window 4.

In operation, the regular meter pointer 5 will make its strokes in the usual manner to measure the exposure. For aligning the follow-up pointer 32a with the meter pointer 5 the scale disk 30 is rotated and the pin 31a moves therewith so that the slide 32 is also rotated about the pivot 5a until the follow-up pointer 32a coincides with the regular pointer 5. The knob 32b of the slide 32 will then glide along the fixed cam 33 and therefore impart a sliding longitudinal movement to the slide 32 in the direction of the guiding slots 31.

The segment 36 is moved in two directions. Its pivot 35 is moved together with the scale disk 30 about the pivot 5a and the segment nose 36a glides along the fixed cam 37. The position of the segment at the end of the rotation of the scale disk 30 is a result of movement in these two directions, i.e. the rotating movement about the pivot 5a and the additional sliding movement of the nose 36a on the cam 37.

The form of the cams 33 and 37, the position of the pivot 35 upon the scale disk 30 and the proportions of the leverlike formation of the segment 36 are so selected that when the follow-up pointer 32a coincides with the regular pointer 5, a wedge formed correction field (corrective mark) visible within the window 4 is limited by the curves 4a, 32c and the side 36b. By coloring that portion of the slide 32 which may appear in the window 4 in contrast with the otherwise colored background of the window two differently colored wedge portions on both sides of the follow-up pointer 32a may be observed, showing the correction direction for considering predominating bright or dark portions of the object. The arrangement provides for an automatic self regulated correction field, in view of the size of the field in the direction of the non-linear strokes of the meter pointer 5 so that it always corresponds to a predetermined number of diaphragm and timing steps in the meter scales or camera setting means.

Thereby, leading scales, as described in view of the examples according to FIG. 1 are unnecessary. Consideration of predominant bright or dark portions of the object is made by setting the follow-up pointer 22a out of coincidence with the meter pointer 5 by an amount as required and as direction of it is indicated by the correction field. This arrangement also includes the possibility of coupling the scale disk 20 with the diaphragm and timing mechanisms of the camera.

Figure 3:
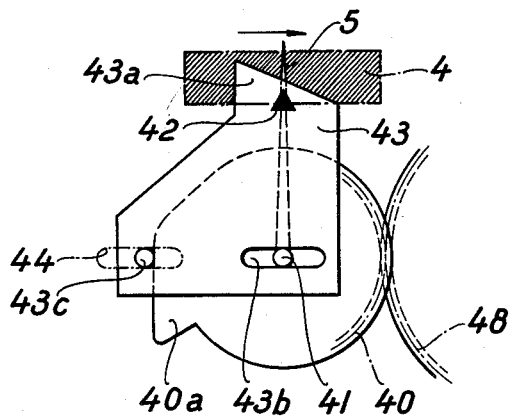
FIG. 3 illustrates schematically a corrective device for a photoelectric exposure meter employing a fixed and a corrective mark position adjustable for compensation of instrument and indication characteristics.
Figure 4:
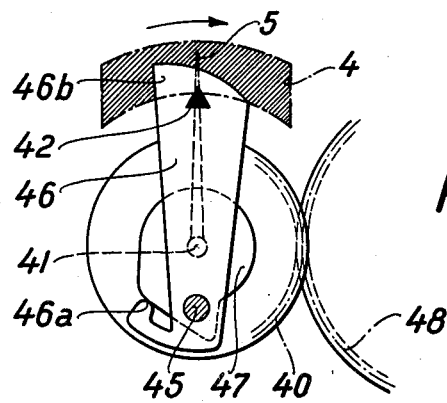
FIG. 4 illustrates a modification of the device shown in FIG. 3.

The embodiments of the invention illustrated in FIGS. 3 and 4 concern electric exposure meters which show the exposure value by means of a movement of the meter pointer back to a zero position. Such backward or return movement of the meter pointer may be accomplished by a return rotation of the entire exposure meter mechanism or by a corresponding regulation of the photocell current (choke regulation). Such exposure meters are known. On both sides of the zero mark there is arranged a correction field (corrective mark) of predetermined extension, both together movable for considering the non-linear characteristic of the meter in view on the linear graduated scales steps or setting means steps.

In FIG. 3 the stroke of the meter pointer 5 in the type of exposure meters referred to above is visible in the window 4. The measuring elements, indicated at 40, rotates about the pointer pivot 41, by means of the meshing gear 48. The gear 48 may be coupled with a scale arrangement or may be coupled directly or indirectly with the setting means of a camera. The measuring operation is accomplished by rotation of the elements 40 about the pivot until the meter pointer 5 coincides with a zero mark 42 which is also visible in the window 4.

The zero mark 42 is carried by a slide 43, which may be partly transparent. The slide 43 is formed with a finger portion 43a which extends to both sides of the zero mark 42 and also extends into the window 4 to serve as a correction mark. The correction mark 43a with the zero mark 42 hereon is movable lengthwise of the window 4 by means of guiding slots 43b and 44 which move, respectively, on the pivot 41 and on a pin 43c carried by the slide 43. The sliding movement of the slide 43 is accomplished by means of a cam 40a on the element 40, the pin 43c then being moved in the slot 44 and the slide 43 then moved lengthwise of the window 4.

The form of the steering cam 40a is so selected that the possible movements of the zero mark 42 equalize the movements of the pointer stroke in relation to the necessary mechanical adjustments in the camera or in relation to the scale intervals on the scale disks.

This embodiment of the invention includes the possibility of the arrangement of a zero mark with a corrective field of unvarying extension as well as the equalization of the different characteristics movements of the meter pointer with relation to the scale intervals or the camera adjustments. This embodiment is therefore of importance not only for the consideration of the corrective features or elements but also concerning exposure meters with zero reading, used as a hand-meter as well as coupled with the setting means of a camera.

FIG. 4 shows an electric exposure meter similar to that of FIG. 3 in which a pivotable carrier 46 is pivoted on a fixed pivot 45 and carries the zero mark 42. The visible portion 46b of the carrier 46 in the window 4 is preferably transparent and colored and forms the correction field (corrective mark) together with corresponding parts of the otherwise colored background of the window 4. The window 4 is formed concentrically about the pivot 45. The measuring element 40 rotates about the pivot 41 of the meter pointer 5 and is provided with a cam 47. The carrier has a nose 46a which runs on the cam 47. The pivot 41 and the pivot 45 are eccentrically related and the cam 47 is formed to function with such eccentric relation between these pivots. The cam 47 functions in a similar manner as the cam 40a in FIG. 3 and equalizes the difference in the characteristics of the pointer strokes and the scale intervals or camera adjustments. That portion of the zero mark carrier 46 which is a wedge-formed corrective mark 46b visible in the window 4, has a determined extension on both sides of the zero mark 42 to which corresponds determined time, diaphragm or light values of the meter scales or of the camera adjustments. These scales or setting means not shown in the drawing are coupled directly or indirectly with the gear 48 meshing with the measuring element 40 and moving it for setting the zero position of the pointer 5. Consideration of predominating bright or dark portions of the object is made in the same manner as described in FIG. 3 by means of the wedge-formed correction field 46b.

It will be understood that this invention is susceptible to modification in order to adapt it to different usages and conditions, and, accordingly, it is desired to comprehend such modifications within this invention as may fall within the scope of the appended claims.

We claim:

1. In an electric exposure meter in which the exposure value is measured by matching the regular meter pointer with a relatively movable indicia, said exposure meter having said regular pointer and a window in which said pointer is visible, a slide having a portion visible in said window, an index mark on said slide portion, said visible portion forming a wedge shaped corrective mark extending on both sides of said index mark and having a predetermined length corresponding to at least one step of the scale intervals of the exposure meter or of the setting steps of the camera adjustments, means responsive to the movement of said regular pointer to a position matching said index mark for moving said slide across said window, said moving means further comprising means for compensating for the non-linear movement of the regular pointer with respect to the linear scale indicating the setting steps of the adjustments of the camera.

2. In an electric exposure meter as claimed in claim 1 and further comprising means for defining limited linear movement of said slide and including a pin on said slide movable in a slot, there being a cam surface on said moving means and engageable with said pin, said cam surface being curved so that movement of said slide and the index mark thereon in response to the movement of the pointer compensates for the non-linear characteristics of the regular pointer with respect to the linear scale indicating the setting steps of the adjustment of the camera.

3. In an electric exposure meter as claimed in claim 1 and further comprising a rotatable member rotatable above the pivoting axis of said regular pointer, said slide being pivotally mounted on a fixed pivot eccentrically positioned with respect to the pivoting axis of said rotatable member and having a nose extending therefrom, a cam member mounted on said rotatable member and engageable with said nose so as to move the index mark and said wedge shaped corrective mark across said window by pivoting said slide above its axis.

References Cited in the file of this patent

UNITED STATES PATENTS

| | | |
|---|---|---|
| 2,073,790 | Goodwin | Mar. 16, 1937 |
| 2,464,527 | Rath | Mar. 15, 1949 |
| 2,484,735 | Rath | Oct. 11, 1949 |
| 2,648,254 | Stimson et al. | Aug. 11, 1953 |